US008279258B2

(12) United States Patent
Ichieda

(10) Patent No.: US 8,279,258 B2
(45) Date of Patent: Oct. 2, 2012

(54) IMAGE DISPLAY DEVICE, IMAGE DISPLAY SYSTEM, AND NETWORK CONNECTION METHOD

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1462 days.

(21) Appl. No.: 11/832,343

(22) Filed: Aug. 1, 2007

(65) Prior Publication Data
US 2008/0074560 A1 Mar. 27, 2008

(30) Foreign Application Priority Data

Sep. 21, 2006 (JP) ................. 2006-255626

(51) Int. Cl.
*H04N 7/14* (2006.01)
(52) U.S. Cl. ................. 348/14.08; 348/14.12; 348/14.01
(58) Field of Classification Search .... 348/14.01–14.16; 715/733; 345/204, 1.1
See application file for complete search history.

(56) References Cited

U.S. PATENT DOCUMENTS

| 7,477,281 B2* | 1/2009 | Chandra et al. ............ 348/14.09 |
| 2005/0052528 A1* | 3/2005 | Ohkawa et al. ............ 348/14.08 |
| 2005/0262223 A1 | 11/2005 | Kimura |
| 2006/0170763 A1* | 8/2006 | Kawamura et al. ........ 348/14.09 |
| 2007/0257927 A1 | 11/2007 | Sakanishi et al. |

FOREIGN PATENT DOCUMENTS

| JP | A 2004-221908 | 8/2004 |
| JP | A 2005-20727 | 1/2005 |
| JP | A 2005-181404 | 7/2005 |
| JP | A-2005-285091 | 10/2005 |
| JP | A 2005-332035 | 12/2005 |
| JP | A-2006-41944 | 2/2006 |
| WO | WO 03/015451 | 2/2003 |
| WO | WO 2005/088602 A1 | 9/2005 |

* cited by examiner

*Primary Examiner* — Melur Ramakrishnaiah
(74) *Attorney, Agent, or Firm* — Oliff & Berridge, PLC

(57) ABSTRACT

An image display device for displaying an image based on an image signal input from a plurality of image supply devices via a network includes a storage section storing connection information used for the image supply device being connected to the image display device via the network, an encoding section encoding the connection information to generate a connection information code which can be recognized by the image supply device, a display section displaying the connection information code and the image based on the image signal input from the image supply device, and an image control section dividing an image display area of the display section into a plurality of divisional areas, and displaying the image based on the image signal input from respective one of the image supply devices in each of the divisional areas.

7 Claims, 12 Drawing Sheets

IMAGE DISPLAY DEVICE, IMAGE DISPLAY SYSTEM, AND NETWORK CONNECTION METHOD

BACKGROUND

1. Technical Field

The present invention relates to an image display device, an image display system, and a network connection method.

2. Related Art

In recent years, it has become possible that when performing a presentation or a report in a conference, materials stored in a personal computer (hereinafter referred to as a "PC") or the like as digital data are enlargedly displayed by a projector, thereby making a number of participants view the contents of the presentation. Further, in recent days, it has become possible to perform the data transfer from a PC to a projector wirelessly by using a projector capable of performing wireless communication with a wireless local area network (LAN) By using such a projector, the cable can be prevented from becoming an obstacle, and further, even in the case in which a number of presenters perform presentations while taking turns using respective PCs, operations for reconnecting the cable can be eliminated.

However, in order for establishing network connection from the PC to the projector with the wireless LAN, necessary connection information including, for example, an IP address of the projector, an identifier such as an extended service set identifier (ESSID) identifying a network name or a password in the wired equivalent privacy (WEP) which is an encryption technology for communication data needs to be input in the PC. In order for performing the input operation, it is required to previously investigate the connection information of the projector, and further, even if the connection information has been figured out, it is still difficult to perform the input operation without knowledge about the network.

In consideration of such a problem, the brochure of International Patent Publication No. WO2003/015451 discloses a technology for simply and easily accessing from one electronic equipment (e.g., a portable information terminal) to other electronic equipment (e.g., a projector). In the Image display system described in the document, the connection information (ID information) for connecting to the projector is attached to the protector itself or a part of the screen in a form of a contact-free tag or a barcode, and the portable information terminal is arranged to be able to establish the network connection with the projector based on the connection information when the user moves the portable information terminal equipped with a contact-free tag reader or a barcode reader close to the projector or the screen to make the portable information terminal read the connection information.

However, in the image display system described in the document, the operation for attaching the contact-free tag or a barcode material (a printed material) to the projector or the screen as the ID information is required, and further, there is a concern that a wrong ID information might be attached in the operation. Further, since it is required to move the portable information terminal close to the projector or the screen in reading the attached ID information, the user must move bringing the portable information terminal every time the connection is performed.

SUMMARY

In consideration of the above problem, the invention has an advantage of providing an image display device, an image display system, and a network connection method allowing the user to easily perform the procedure for establishing the network connection to the image display device such as a projector.

An image display device according to an aspect of the invention is for displaying an image based on an image signal input from a plurality of image supply devices via a network, and includes a storage section storing connection information used for the image supply device being connected to the image display device via the network, an encoding section encoding the connection information to generate a connection information code which can be recognized by the image supply device, a display section displaying the connection information code and the image based on the image signal input from the image supply device, and an image control section dividing an image display area of the display section into a plurality of divisional areas, and displaying the image based on the image signal input from respective one of the image supply devices in each of the divisional areas.

According to an image display device of an aspect of the invention, since the connection information for establishing the network connection therewith is encoded to generate the connection information code, and displayed as an image, the operation for attaching the contact free tags or printed materials provided with the connection information to the image display device can be eliminated, and further the concern of attaching wrong connection information can also be eliminated. As a result, the procedure for establishing the network connection with the image display device can easily be performed.

Further, since the image control section divides the image display area of the display section into a plurality of areas, and the image based on the image signal input from one of the image supply devices different from each other is displayed each of the plurality of areas, the connection state of the network (e.g., the number of image supply devices connected thereto, what image supply device is connected) can easily be recognized.

In this image display device, it is possible that the encoding section adds area information used for specifying each of the divisional areas to the connection information, and encodes the connection information added with the area information to generate a plurality of connection information codes respectively corresponding to the divisional areas, and the image control section displays the connection information codes in the respective divisional areas to allow the image supply devices to recognize the connection information and the area information, and then obtains the area information recognized by the image supply device, and further displays the image based on the image signal input from the image supply device in the divisional area indicated by the area information.

According to this image display device, since the encoding section adds the area information, with which each of the divisional areas can be specified, to the connection information and then encodes the both, a plurality of connection information codes corresponding to the divisional areas is generated, and the image control section displays the connection information corresponding to the respective divisional areas in the respective divisional areas to allow the image supply devices to recognize the connection information and the area information, and after then, obtains the area information recognized by the image supply device, and displays the Image based on the image signal input from the image supply device in the divisional area indicated by the area information. In other words, since it becomes possible for the user to make the image be displayed in a desired area by making the image supply device recognize the connection information code displayed in the divisional area, the user can easily designate the divisional area where the image is displayed.

In this image display device, it is possible that the different connection information is assigned to each of the divisional areas, the encoding section encodes the connection information assigned to each of the divisional areas to generate a plurality of connection information codes, and the image control section displays the connection information codes in the respective divisional areas to allow the Image supply devices to recognize the connection information, and then obtains the connection information recognized by the image supply device, and further displays the image based on the image signal input from the image supply device in the divisional area corresponding to the connection information.

According to this image display device, the encoding section encodes the connection information assigned to the respective divisional areas to generate a plurality of connection information codes, and the image control section displays the connection information codes corresponding to the respective divisional areas to allow the image supply devices to recognize the connection information, and after then, obtains the connection information recognized by the image supply device, and displays the image based on the image signal input from the image supply device in the divisional area corresponding to the connection information. In other words, since it becomes possible for the user to make the image be displayed in a desired area by making the image supply device recognize the connection information code displayed in the divisional area, the user can easily designate the divisional area where the image is displayed.

In this image display device, it is possible that the encoding section generates the connection information code common to the divisional areas, and the image control section displays the connection information code in the display section to allow the image supply devices to recognize the connection information, and then assigns either one of the plurality of divisional areas to the image supply device connected via the network, and displays the image based on the image signal input from the image supply device in the divisional area assigned to the image supply device.

According to this image display device, since the image control section assigns the divisional area for displaying the image to the image supply device connected via the network, the case in which a plurality of image supply devices attempt to display the image in the same divisional area can be prevented.

The image display device preferably includes a switching section switching between a state in which a plurality of images based on the image signals input from the plurality of image supply devices is displayed in the image display area of the display section and a state in which the image based on the image signal input from either one of the plurality of image supply devices is displayed in substantially the whole area of the image display area.

According to this image display device, since the switching section for switching between the state in which a plurality of images are displayed in the image display area of the display section and the state in which either one of the images is displayed in substantially the whole area, one image can be appreciated in a condition of being displayed in a large area, and further, the state of the network connections can easily be confirmed before and after the appreciation or during the appreciation.

An image display system according to another aspect of the invention includes a plurality of image supply devices each outputting an image signal, and an image display device displaying an image based on the image signal input from each of the plurality of image supply devices via a network, wherein the image display device includes a storage section storing connection information used for the image supply device being connected to the image display device via the network, an encoding section encoding the connection information to generate a connection information code which can be recognized by the image supply device, a display section displaying the connection information code and the image based on the image signal input from the image supply device, and an image control section dividing an image display area of the display section into a plurality of divisional areas, and displaying the image based on the image signal input from respective one of the image supply devices in each of the divisional areas, the image supply device includes, a connection information recognition section analyzing the connection information code displayed by the display section to recognize the connection information, and a network connection section, based on the connection information recognized by the connection information recognition section, establishing a network connection with the image display device.

According to this image display system, since the image display device encodes the connection information for establishing the network connection therewith to generate the connection information code, and displays it as an image, the operation for attaching the contact free tags or printed materials provided with the connection information to the image display device can be eliminated, and further the concern of attaching wrong connection information can also be eliminated. As a result, the procedure for establishing the network connection with the image display device can easily be performed.

Further, since the image display device is provided with the image control section which divides the image display area of the display section into a plurality of areas, and displays the image based on the image signal input from one of the image supply devices different from each other in each of the plurality of areas, the connection state of the network (e.g., the number of image supply devices connected thereto, or what image supply device is connected) can easily be recognized.

A network connection method according to another aspect of the invention is a network connecting method of an image display system including an image supply device outputting an image signal, and an image display device having a display section, and displaying an image based on the image signal input from the image supply device via a network in an image display area of the display section, including the steps of the image display device encoding connection information for connecting the image display device itself via the network to generate a connection information code which can be recognized by the image supply device, the image display device displaying the connection information code in the image display area, the image supply device analyzing the connection information code displayed in the image display area to recognize the connection information, the image supply device performing the network connection with the image display device based on the recognized connection information, the image display device coordinating one of divisional areas obtained by dividing the image display area with the image supply device connected via the network, the image display device displaying the image based on the image signal input from the image supply device in the area coordinated with (assigned to) the image supply device.

According to the present network connection method, since the image display device encodes the connection information for establishing the network connection therewith to generate the connection information code, and displays it as an image, the operation for attaching the contact free tags or printed materials provided with the connection information to the image display device can be eliminated, and further the concern of attaching wrong connection information can also be eliminated. As a result, the procedure for establishing the network connection with the image display device can easily be performed.

Further, since the image display device coordinates one of a plurality of areas obtained by dividing the image display area with the image supply device connected via the network, and displays the image based on the image signal input from the image supply device in the area coordinated with the image supply device, the connection state of the network (e.g., the number of image supply devices connected thereto, what image supply device is connected) can easily be recognized.

Further, in the case in which the image display device, the image display system, and the network connection method described above are configured using the computers provided to the image display device and the image supply device, the present invention can be configured as aspects of a program for realizing the function, or a recording medium recording the program in a computer readable manner. As a recording medium, a flexible disk, a CD-ROM, a magnetooptical disk, an IC card, a ROM cartridge, punch cards, a printed material with codes such as bar codes printed thereon, an internal storage apparatus (e.g., a memory such as RAM or ROM) and an external storage apparatus of the projector, or other various medium the computer can read can be used.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

First Embodiment

An image display system according to a first embodiment of the invention will be explained with reference to the accompanying drawings.

Figure 1:
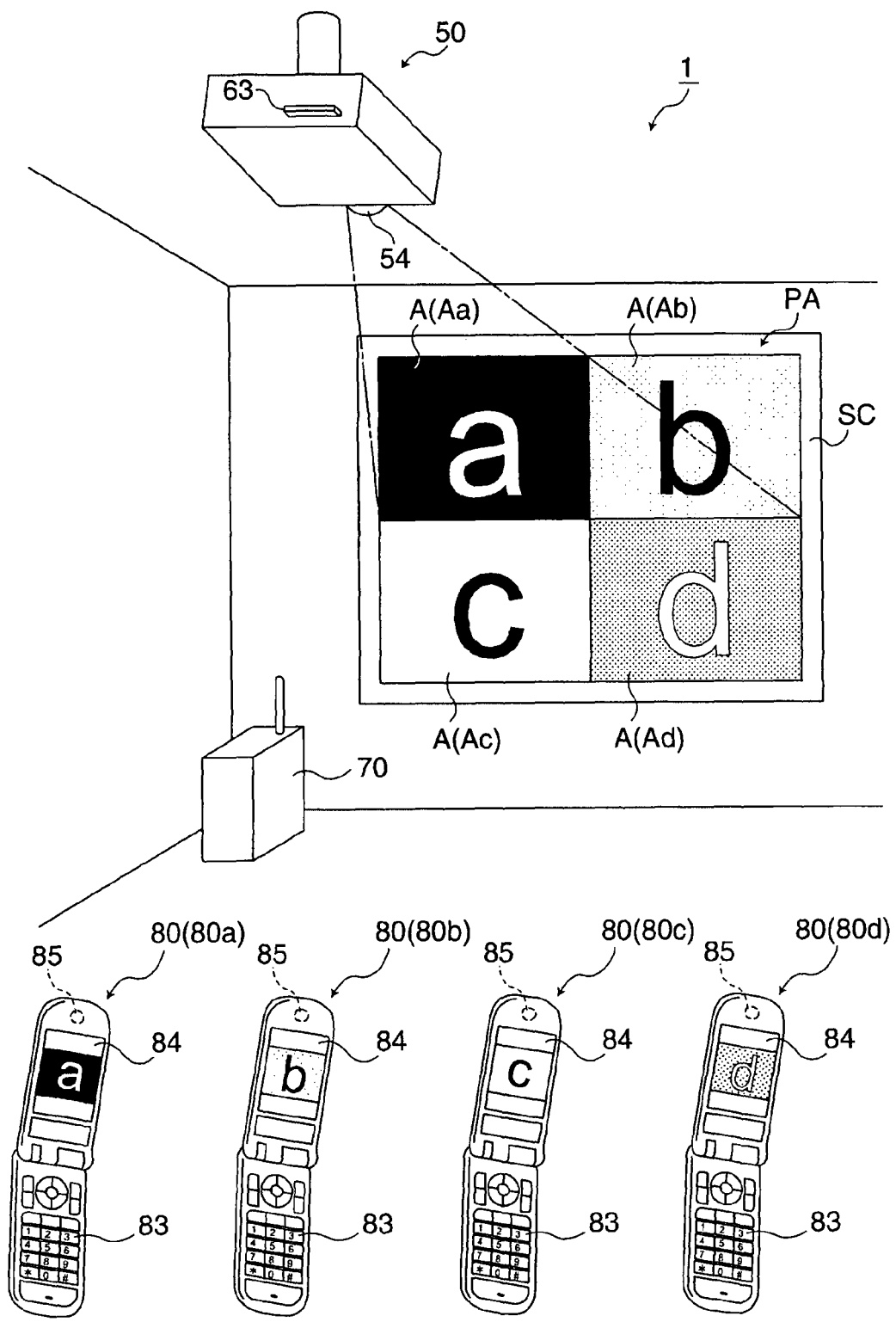
FIG. 1 is an explanatory diagram showing a schematic configuration of an image display system according to a first embodiment.

FIG. 1 is an explanatory diagram showing a schematic configuration of an image display system according to the first embodiment.

As shown in FIG. 1, the image display system 1 of the present embodiment is configured including a projector 50 capable of network communication with a wireless LAN, and an information terminal 80 such as a mobile phone capable of network communication with a wireless LAN.

The information terminal 80 is arranged to supply (transmit) an image signal to the projector 50 in a condition in which the network connection (wireless LAN connection) with the wireless LAN is established between the information terminal 80 and the projector 50, and corresponds to the image supply device of the embodiment of the invention. The projector 50 is an image display device mounted on (suspended from) the ceiling of a conference room or the like and for protecting an image (received image) in accordance with the image signal received from the information terminal 80 on a screen SC or the like provided on the wall thereof. In the present embodiment, an infrastructure mode (an access point mode) for connecting the devices via an access point 70 is used as a connection form of the wireless LAN, and the communication between the projector 50 and the information terminal 80 is performed via the access point 70. It should be noted that the explanations that the access point 70 intervenes the communication between the projector 50 and the information terminal 80 will hereinafter be omitted.

The projector 50 is capable of the wireless LAN connection with four information terminals 80 (80a through 80d), and at the same time, is arranged to be able to have the image display area (the projection area PA) be divided into four sub-areas A (Aa through Ad). Therefore, the projector 50 is capable of displaying the received images from a plurality of (up to four) information terminals 80 connected via the wireless LAN respectively on the individual sub-areas A.

Further, the projector 50 is capable of projecting a connection information code C (see FIG. 8) obtained by figuring (coding) the connection information necessary for the connection such as the ESSID representing the network name when establishing the wireless LAN connection with the information terminals 80 on the screen SC. In the present embodiment, although it is assumed that the QR code (registered trademark), a matrix type two-dimensional code, is used as the connection information code C, other matrix type two dimensional codes or stack type two-dimensional code having a shape formed by stacking barcodes can also be used. Alternatively, other codes than two-dimensional codes such as a three-dimensional code formed by varying a two-dimensional code In a time-series manner can also be used.

The information terminal 80 is provided with an imaging section 85 formed of a CCD camera and so on, and is capable of imaging the connection information code C projected on the screen SC by the projector 50. Further, the information terminal 80 is arranged to be able to recognize the connection information of the projector 50 from the connection information code C thus imaged, and becomes to be able to supply the projector 50 with the image signal by performing the wireless LAN connection with the projector 50 based on the connection information.

Then, schematic configurations of the projector 50 and the information terminal 80 will be explained.

Figure 2:
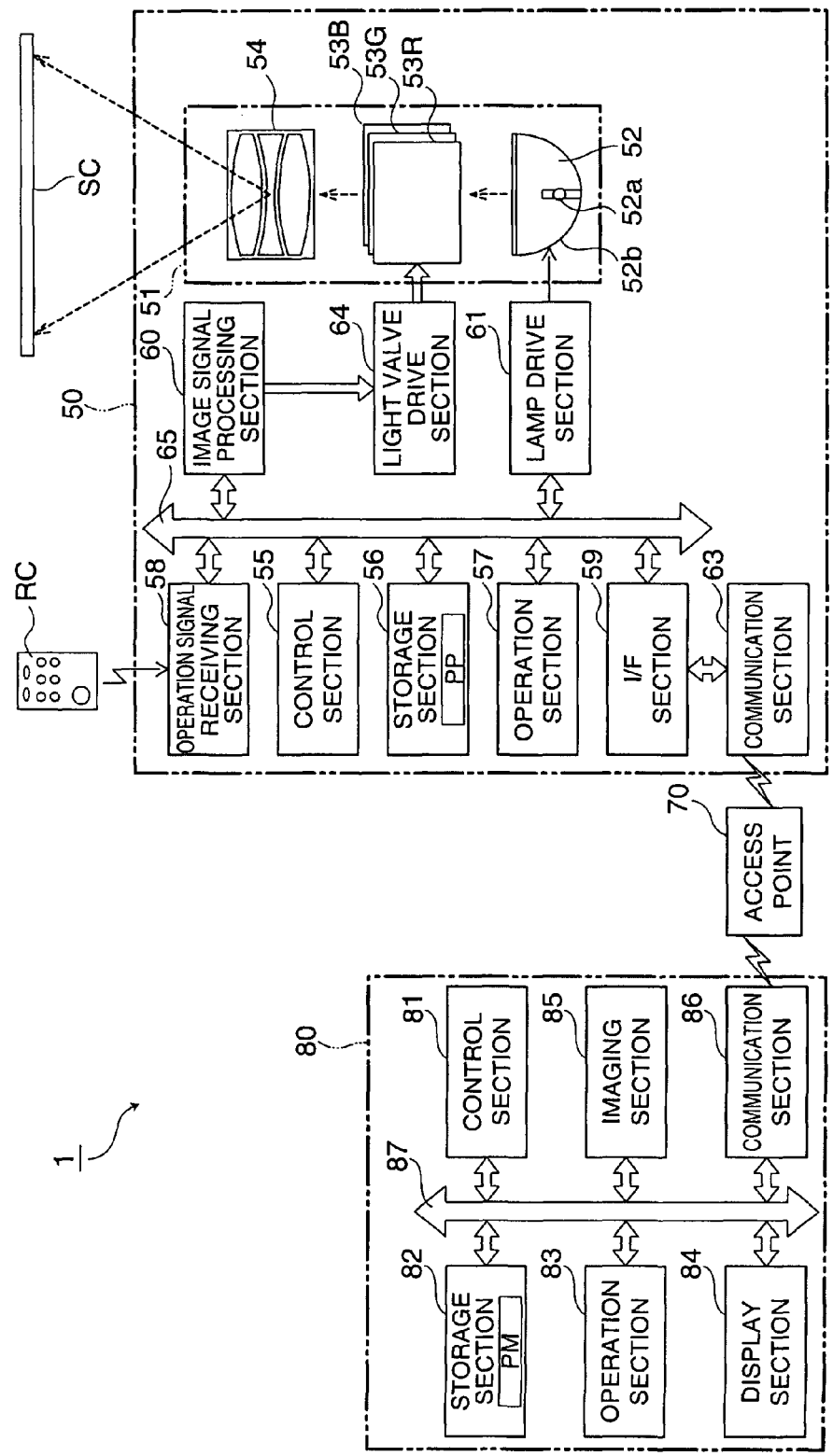
FIG. 2 is a block diagram showing the schematic configuration of the image display system according to the first embodiment.

FIG. 2 is a block diagram showing schematic configurations of the projector 50 and the information terminal 80 in the image display system 1

As shown in FIG. 2, the projector 50 is composed of an image projection section 51 as a display section, a control section 55, a storage section 56 as a storage section, an operation section 57, an operation signal reception section 58, an interface (I/F) section 59, an image signal processing section 60, a lamp drive section 61, a communication section 63, a light valve drive section 64, a remote controller RC, and so on, wherein the image projection section 51 includes a light source section 52, three liquid crystal light valves 53R, 53G, and 53B, and a projection lens 54 as a projection optical system, and so on.

The light source section 52 is configured including a discharge lamp 52a such as a high-pressure mercury vapor lamp or a metal halide lamp and a reflector 52b for reflecting the light emitted by the discharge lamp 52a towards the side of the liquid crystal light valves 53R, 53G, and 53B. The light emitted from the light source section 52 is converted into the light having a substantially even intensity distribution by an integrator optical system not shown, and is separated into colored light components of red (R), green (G), and blue (B), the three primary colors of light, and subsequently enters the liquid crystal light valves 53R, 53G, and 53B, respectively.

The liquid crystal light valves 53R, 53G, and 53B are each composed of a liquid crystal panel formed by encapsulating liquid crystal between a pair of transparent substrates, and on the inside surface of each of the transparent substrates, there are provided transparent electrodes (pixel electrodes) in a matrix, the transparent electrodes capable of applying a drive voltage to the liquid crystal in every microscopic area (pixel).

When the light valve drive section 64 applies the drive voltage corresponding to the image signal input thereto to each of the pixels, each of the pixels is set to have a light transmission corresponding to the image signal. In other words, the light emitted from the light source section 52 is modulated by being transmitted through the liquid crystal light valves 53R, 53G, and 53B, thus an image light beam corresponding to the image signal is formed for each colored light. The image light beams of respective colored light thus formed are combined for every pixel to be the image light beam representing a color image by a color composition optical system not shown, and then enlargedly projected on the screen SC or the like by the projection lens 54.

The control section 55 is provided with a central processing unit (CPU), a random access memory (RAM) used as a temporary storage for various data or the like, and so on, and functions as a computer. The control section 55 operates in accordance with a control program stored in the storage section 56, thereby performing overall control of operations of each of the sections 56 through 61 connected to each other via a bus 65.

The storage section 56 is formed of a non-volatile memory such as a mask read-only memory (ROM), a flash memory, a ferroelectric memory (FeRAM). The storage section 56 stores various control programs, various data, and so on for controlling the operations of the projector 50.

The data stored in the storage section 56 includes the connection information necessary for an external device to be connected to the projector 50 via the wireless LAN. The connection information includes information representing whether or not the dynamic host configuration protocol (DHCP) is used, an IP address of the projector 50, a subnet mask, a default gateway, a password of the WEP for encrypting the communication data, and so on in addition to the ESSID described above.

Further, the control program stored in the storage section 56 includes a connection establishing program PP defining the content and the order of the process for establishing the wireless LAN connection with the external device. The connection establishing program PP includes a code generation program for encoding the connection information to generate the connection information code C as a subroutine. It should be noted that since the control section 55 can encode the connection information stored in the storage section 56 by performing in accordance with the code generation program, the control section 55 when operating in accordance with the code generation program corresponds to an encoding section of the embodiment of the invention.

The operation section 57 and the remote controller RC are each equipped with a plurality of operation buttons for performing various instructions to the projector 50. As the operation buttons the operation section 57 and the remote controller RC are equipped with, "a power button" for turning the power on and off, "a menu button" for projecting a menu image, "a cursor button" for moving the cursor on the menu image, "a connection button" for instructing the wireless LAN connection, and so on can be cited. When the user operates the various operation buttons of the operation section 57, the operation section 57 outputs an operation signal corresponding to the operation content by the user to the control section 55. Further, when the user operates the various operation buttons of the remote controller RC, the remote controller RC generates an infrared operation signal corresponding to the operation content by the user, and then the operation signal reception section 58 receives the signal and transfers it to the control section 55.

The interface section 59 implements various device controllers such as a universal serial bus (USB) controller and a peripheral component interconnect (PCI) controller, and performs data input/output with an external device. The interface section 59 is provided with a card slot and a USB port (neither shown) for connecting an external device thereto, and the communication section 63 is connected to the card slot of the present embodiment.

The communication section 63 is a wireless LAN card compliant to a wireless LAN standard such as IEEE 802.11b, IEEE 802.11g, or IEEE 802.11a, and is capable of performing transmission and reception of data relating to the wireless LAN connection, reception of the image signal, and so on in response to the instructions of the control section 55. When the communication section 63 receives the image signal, the image signal is output to the image signal processing section 60. It should be noted that it is sufficient for the communication section 63 to be a wireless terminal device capable of connecting the wireless LAN, and the communication section 63 can be arranged to use a wireless LAN adaptor to be attached to the USB port, or a wireless LAM module previously built-in in the projector 50.

The image signal processing section 60 is an image processor, and performs signal processing on the image signal input via the input terminal (not shown) or the interface section 59 in accordance with the instructions of the control section 55, thereby generating the image data for defining the drive voltage to be applied to each of the pixels of the liquid crystal light valves 53R, 53G, and 53B. In this case, the image signal processing section 60 of the present embodiment performs a scaling (resolution conversion) process on each of the image signals input from the respective information terminals 80 so that the images received from the individual information terminals 80 are displayed on the respective sub-areas A obtained by dividing the projection area PA into four (two each vertically and horizontally, thereby generating the image data corresponding to the size of the sub-area A and also generating united image data by conjoining the image data. Further, it is possible for the image signal processing section 60 to perform such an image processing that the received image from either one of the plurality of information terminals 80 connected thereto via the wireless LAN is displayed on the entire area of the projection area PA. The image signal processing section 60 outputs the image data thus generated to the light valve drive section 64 as the image signal. It should be noted that the image signal processing section 60 and the control section 55 correspond to an image control section of the embodiment of the invention.

The light valve drive section 64 drives the three liquid, crystal light valves 53R, 53G, and 53B in accordance with the image signal (image data) input from the image signal processing section 60. As a result, the image (image light beam) corresponding to the image signal is projected from the image projection section 51.

The lamp drive section 61 is a lighting control circuit for controlling turning on and off the light source section 52, and is configured including an igniter circuit for generating a high voltage for turning on the light source section 52 to form a discharge path, and a ballast circuit (neither shown) for maintaining the stable lighting state after turning on the light.

Then, a schematic configuration of the information terminal 80 will be explained taking the case with a mobile phone as an example.

As shown in FIG. 2, the information terminal 80 is provided with a control section 81, a storage section 82, an operation section 83, a display section 84, an imaging section 85, a communication section 86, and so on in addition to a talk section (e.g., a talk antenna, a microphone, a loudspeaker) not shown.

The control section 81 is provided with a CPU, thus functioning as a computer, and operates in accordance with a control program stored in the storage section 82, thereby performing overall control of operations of each of the sections 82 through 86 connected to each other via a bus 87.

The storage section 83 is formed of a non-volatile memory such as a mask ROM, a flash memory, or an FeRAM. The storage section 82 stores various control programs for controlling the operations of the information terminal 80, image data to be projected by the projector 50, and so on.

The control program stored in the storage section 82 includes a connection establishing program PM defining the content and the order of the process for establishing the wireless LAN connection with an external image display device. The connection establishing program PM includes a code analysis program for analyzing the connection information code C included in the image shot by the imaging section 85 to recognize the connection information included in the connection information code C as a subroutine. It should be noted that since the control section 81 becomes to be able to analyze the connection information code C to recognize the connection information included therein when the control section 81 operates with the code analysis program, the control section 81 when operating in accordance with the code analysis program corresponds to a connection information recognition section of the embodiment of the invention.

The operation section 83 is equipped with a plurality of operation buttons for performing various instructions to the information terminal 80. As the operation buttons the operation section 83 is equipped with, "a mode switching button" for switching between the state (a phone mode) in which the information terminal 80 can be used as a telephone and the state (a camera mode) in which it can be used as a digital camera, "a connection button" for instructing the wireless LAN connection, "a disconnection button" for instructing disconnection of the wireless LAN connection, "a shutter button" for instructing the imaging section 85 to shoot (record) an image, "a display switching button" for switching the display state (described in detail below) of a projected image, and so on can be cited in addition to various buttons necessary for performing a phone call (talk button). When the user operates the operation button of the operation section 83, the operation section 83 outputs an operation signal corresponding to the operation content by the user to the control section 81. It should be noted that there is no need for all of the operation buttons such as the connection button, the disconnection button, the shutter button, and the talk button to be independent buttons, but it is possible to assign a plurality of functions to one button, and to switch the operation signals output therefrom in accordance with, for example, switching of the modes.

The display section 84 is, for example, a liquid crystal display device of the active matrix drive type with the TFT drive, and displays an image according to the image data output from the control section 81 or the imaging section 85.

The imaging section 85 is formed of, for example, a charge coupled device (CCD) camera or a complementary metal oxide semiconductor (CMOS) camera, and shoots the subject in response to the instruction of the control section 81 to generate the image data representing the shot result (shot image). The information terminal 80 starts periodic shooting (generation of the image data) at the time point when switched to the camera mode by the operation of the user and so on, and displays (monitor-displays) the shot images in real time on the display section 84. In this state, when the shutter button of the operation section 83 is operated (held down) by the user, the control section 81 stores (records) a frame (one screen) of image data generated by the imaging section 85 at that point in the storage section 82. It should be noted that in the present specification shooting for monitor-displaying on the display section 84 is simply denoted by "shooting," while storing the image data in the storage section 82 in response to the operation of the shutter button is denoted by "shooting (recording)."

The communication section 86 is a wireless LAN module compliant to the wireless LAN standard such as IEEE 802.11b, IEEE 802.11g, or IEEE 802.11a, and is capable of performing transmission and reception of command relating to the wireless LAN connection, transmission of the image signal, and so on in response to the instructions of the control section 81. It should be noted that in the case in which the information terminal 80 is equipped with a card slot or a USB port for connecting an external device, it is possible to use the wireless LAN card or the wireless LAN adaptor capable of connecting such a card slot or a USB port as the communication section 86.

The action of the image display system 1 will now be explained with reference to the accompanying drawings.

When the power is applied to the projector 50, the control section 55 of the projector 50 starts the operation following the control program stored in the storage section 56, and after performing various initialization operations, waits for an input signal from the operation section 57 or the operation signal reception section 58. In this state, the user can perform the instruction for starting the wireless LAN connection with an external device (the information terminal 80 in the present embodiment) by operating the connection button of the operation section 57 or the remote controller RC.

Figure 3:
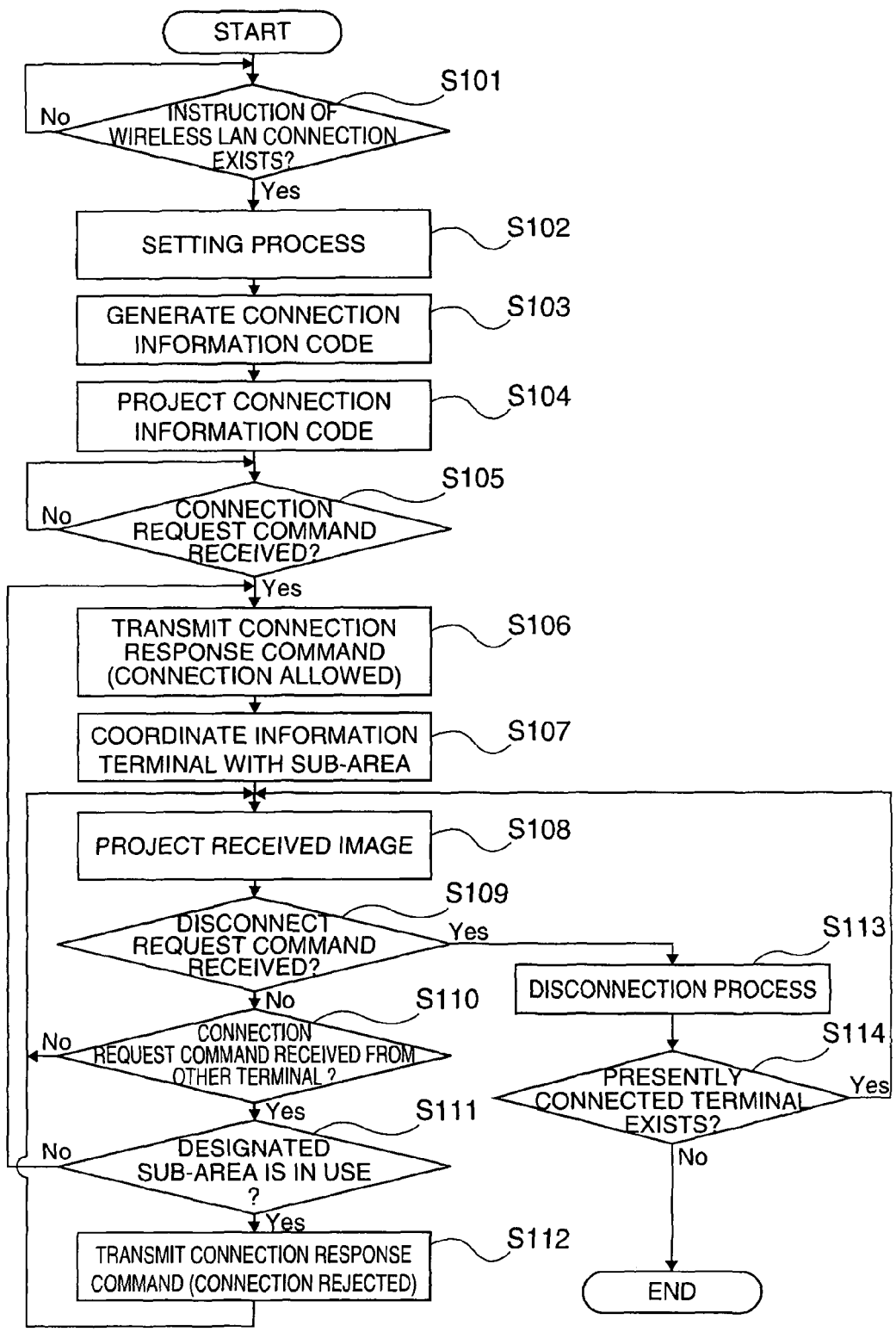
FIG. 3 is a flowchart for explaining the operation of a projector according to the first embodiment.
Figure 4:
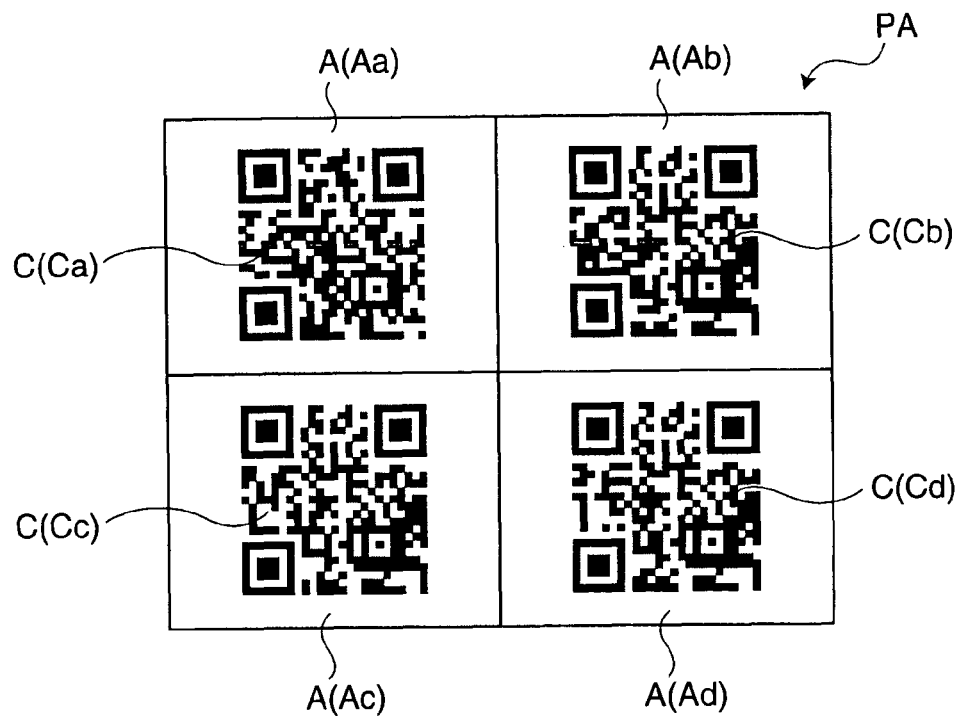
FIG. 4 is an explanatory diagram showing an image displayed in a projection area PA during operations.
Figure 5:
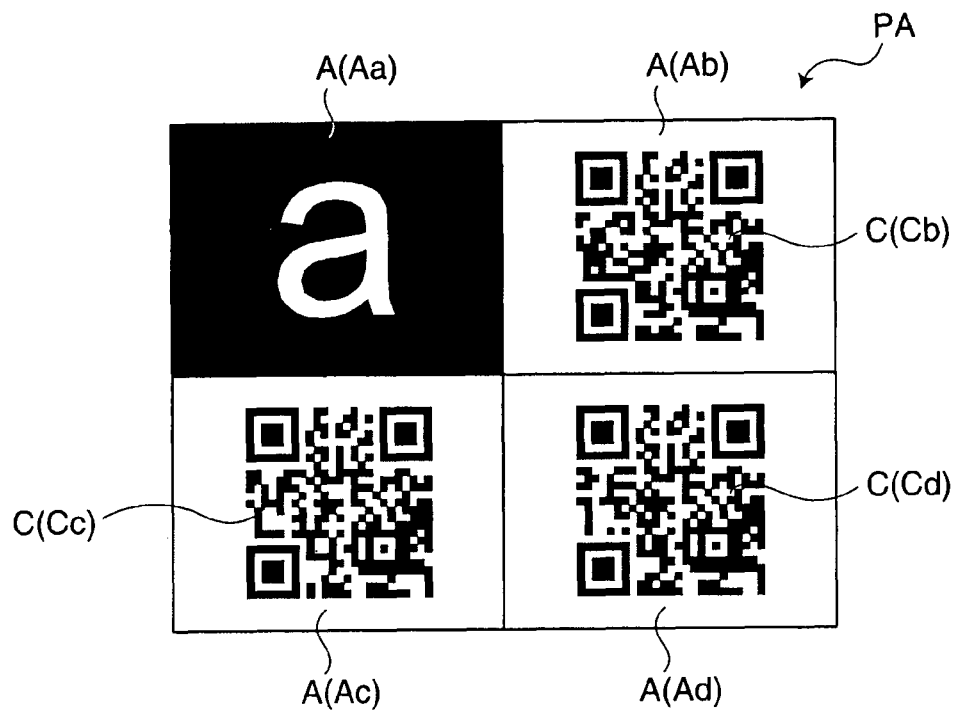
FIG. 5 is an explanatory diagram showing an image displayed in the projection area PA during operations.
Figure 6:
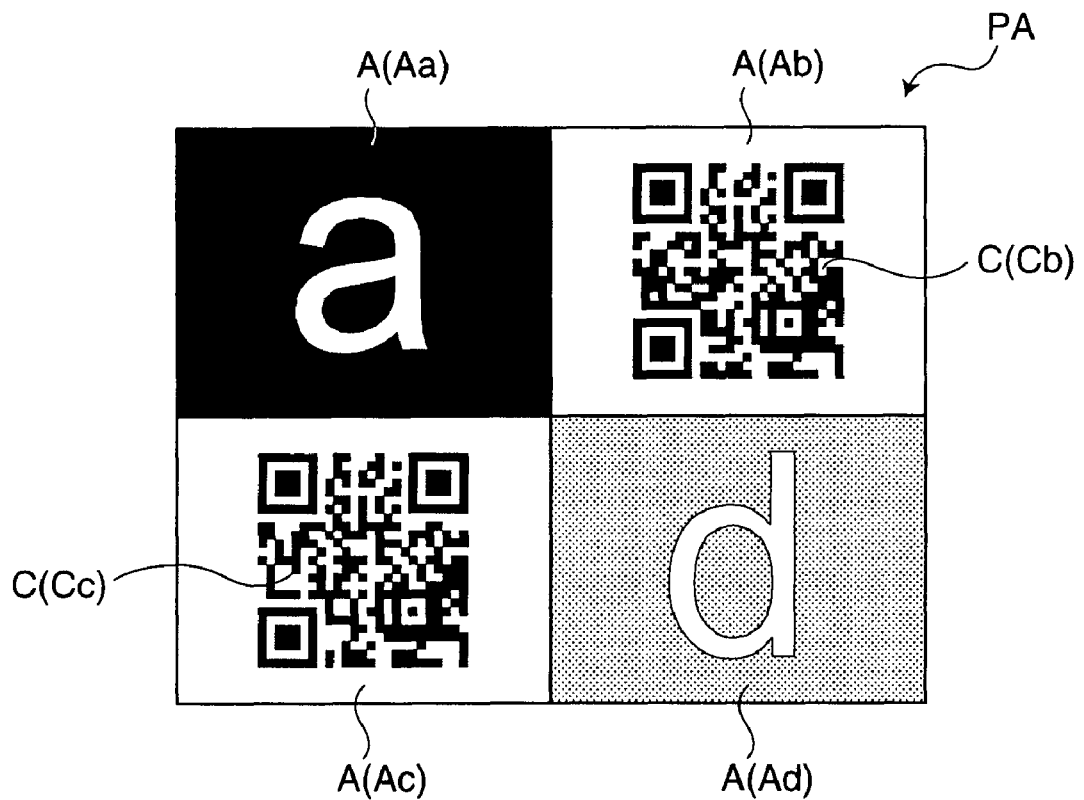
FIG. 6 is an explanatory diagram showing an image displayed in the projection area PA during operations.

FIG. 3 is a flowchart for explaining the operation of the projector 50, and FIGS. 4 through 6 are explanatory diagrams showing images displayed in the projection area PA during the operation.

As shown in FIG. 3, in the step S101, the control section 55 judges whether or not the instruction (operation of the connection button) for starting the wireless LAN connection has been made in accordance with the operation signal input from the operation section 57 and the operation signal reception section 58. If the instruction has been made, the process proceeds to the step S102, and if not, the step S101 is repeated.

If the process proceeds to the step S102 in response to the instruction for starting the wireless LAN connection, the control section 55 starts the operation following the connection establishing program PP stored in the storage section 56. Firstly, the connection information is retrieved from the storage section 56, and based on the connection information, the setting for establishing the wireless LAN connection is provided to the projector 50.

After then, in the step S103, the control section 55 operates with the code generation program, which is a subroutine of the connection establishing program PP, to encode the retrieved connection information, thus generating the image data representing the connection information code. In this case, the control section 55 adds the area information (e.g., text data representing "Aa," "Ab," "Ac," and "Ad") capable of specifying the sub-areas Aa through Ad to the retrieved connection information, and performs the encoding thereafter, thus generating the image data representing four connection information codes Ca through Cd respectively corresponding to the sub-areas Aa through Ad. It should be noted that when generating the image data, it is required to arrange a substantially square cell (the smallest unit) forming the connection information code C (Ca through Cd) to be sufficiently larger than a pixel of the liquid crystal light valves 53R, 53G, and 53B determining the resolution of the projection image in order for making the connection information be recognized with good accuracy.

In the step S104, the control section 55 outputs the image data thus generated to the image signal processing section 60 as the image signal. The image signal processing section 60 generates the image data with which the connection information codes Ca through Cd are displayed in the respective sub-areas Aa through Ad using a similar process to the signal process described above, and outputs the image data to the light valve drive section 64. As a result, the image corresponding to the image signal is projected from the image projection section 51 on the screen SC, and as shown in FIG. 4, the connection information codes Ca through Cd are respectively displayed in the sub-areas Aa through Ad of the projection area PA. In this case, it is possible to display a message such as "for establishing the wireless LAN connection, please shoot either one of the connection information codes" in the margin inside the projection area PA or the like. In the state in which the connection information codes Ca through Cd are displayed, if the user shoots (records) either one of the connection information codes C with the information terminal 80, the information terminal 80 can recognize the connection information and the area information included therein by analyzing the connection information code C.

In the step S105, the control section 55 judges whether or not the communication section 63 has received a connection request command from the information terminal 80. The connection request command is a command transmitted by the information terminal 80 to the projector 50 when the user instructs the information terminal 80 to establish the wireless LAN connection with the projector 50 by operating the operation section 83 of the information terminal 80, and includes the area information obtained by analyzing the connection information codes C together with the IP address of the information terminal 80 transmitting this connection request command. If the communication section 63 has received the connection request command, the process proceeds to the step S106, and if not, the step S105 is repeated.

If the process proceeds to the step S106 in response to the reception of the connection request command, the control section 55 transmits a connection response command for allowing the connection from the communication section 63 to the information terminal 80. Thus, the wireless LAIN connection between the information terminal 80 and the projector 50 has established, and it becomes possible to transmit the image signal from the communication section 86 of the information terminal 80 to the communication section 63 of the projector 50.

In the step S107, the control section 55 performs coordination between the information terminals 80 and the sub-areas A. Specifically, the control section 55 obtains the IP address and the area information of the information terminal 80 included in the connection request command, and stores the both (the IP address and the area information) in the RAM while coordinating to each other so that the image received afterward from the information terminal 80 with the IP address is displayed in the sub-area A represented by the area information.

In the step S108, in response to the communication section 63 receiving the image signal transmitted from the information terminal 80, the control section 55 identifies the information terminal 80, which is the source of the transmission, based on the IP address included in the received signal, and retrieves the area information corresponding to the IP address from the RAM. After then, the control section 55 outputs the retrieved area information to the image signal processing section 60, and at the same time instructs the image signal processing section 60 to process the image signal. The image signal processing section 60, in response to the instruction, generates the image data with which the image corresponding to the input image signal is displayed in the sub-area A indicated by the area information, and outputs the image data to the light valve drive section 64. Thus, the received image is displayed in the sub-area A (e.g., sub-area Aa) designated by the area information as shown in FIG. 5. It should be noted that the connection information codes Cb through Cd remain displayed on the other sub-areas Ab through Ad.

While the received image is projected, the user can instruct disconnection of the wireless LAN connection by operating the disconnection button provided to the operation section 83 of the information terminal 80. If the disconnection button is operated, the information terminal 80 transmits the disconnection request command to the projector 50.

In the step S109, the control section 55 judges whether or not the disconnection request command has been received from the information terminal 80 presently connected thereto. If the disconnection request command has been received via the communication section 63, the process proceeds to the step S113, and if not, it proceeds to the step S110.

If the process proceeds to the step S110 with no disconnection request command received, the control section 55 judges whether or not the connection request command has been received from another of the information terminals 80, namely the information terminal 80 other than the information terminal 80 already presently connected thereto. As a result, if it has not been received yet, the process returns to the step S108, and continues to project the received image from the information terminal 80 presently connected thereto. On the other hand, if the connection request command has newly been received, the process proceeds to the step S111.

In the step S111, the control section 55 judges whether or not the sub-area A designated by the new connection request command is in use, namely, whether or not the area information included in the connection command has already been stored in the RAM while coordinated with the IP address of the information terminal 80 already connected thereto. As a result, if the sub-area A thus designated is in use, the process proceeds to the step S112. On the other hand, if the sub-area A is not in use, the process returns to the step S106, and the connection response command for allowing the connection is transmitted (step S106) to the information terminal 80, which transmitted the new connection request command, and at the same time, the IP address and the area information included in the new connection request command are stored (step S107) in the RAM while coordinated with each other, and the received image is projected (step S108).

It should be noted that since the image signals are transmitted from a plurality of information terminals 80 on and after this step, the control section 55, in the step S108, identifies the source of the transmission of the received image signal based on the IP address, and at the same time, instructs the image signal processing section 60 so that the images are displayed in the respective sub-areas A each coordinated with respective one of the IP addresses. As a result, as shown in FIG. 6, for example, the received images from the independent information terminals 80 are respectively displayed in a plurality of sub-areas Aa, Ad inside the projection area PA. Further, by repeating the process along the above flow chart, the images received from the respective information terminals 80 are displayed in all of the sub-areas Aa through Ad as shove in FIG. 1 in the condition in which the projector 50 is connected to four information terminals 80.

In the step S111, if the designated sub-area A is in use, and accordingly, the process proceeds to the step S112, the control section 55 transmits the connection response command for rejecting the connection from the communication section 63 to the information terminal 80. After then, the process returns to the step S108, and the projection of the received data from the information terminal 80 already connected thereto is continued.

If the process proceeds to the step S113 after receiving the disconnection request command in the step S109, the control section 55 performs a disconnection process for the wireless LAN connection with the information terminal 80, which has transmitted the disconnection request command, and at the same time, deletes the IP address of the information terminal 80 and the area information stored while coordinated with the IP address thereof from the RAM. Further, the control section 55 outputs the image data of the connection information code C corresponding to the sub-area A to the image signal processing section 60 so that the connection information code C is displayed in the sub-area A, which the information terminal 80 has used, on and after this step, and the process proceeds to the step S114.

When the process proceeds to the step S114, the control section 55 judges whether or not any other information terminals 80 presently connected thereto exist. As a result, if no information terminal 80 presently connected thereto exists after the disconnection process in the step S113, the execution of the connection establishing program PP is terminated, and the control section 55 returns to the standby state. On the other hand, if the information terminal 80 presently connected thereto exists, the process returns to the step S108, and the projection of the received image from the information terminal 80 presently connected thereto is continued.

The operation of the information terminal 80 will now be explained.

When the power is applied to the information terminal 80, the control section 81 starts the operation following the control program stored in the storage section 82, and after performing various initialization operations, waits for an incoming call to the talk section and an input signal from the operation section 83. In this state, the user is allowed to make an instruction for starting the wireless LAN connection with the projector 50 by operating the connection button of the operation section 83.

Figure 7:
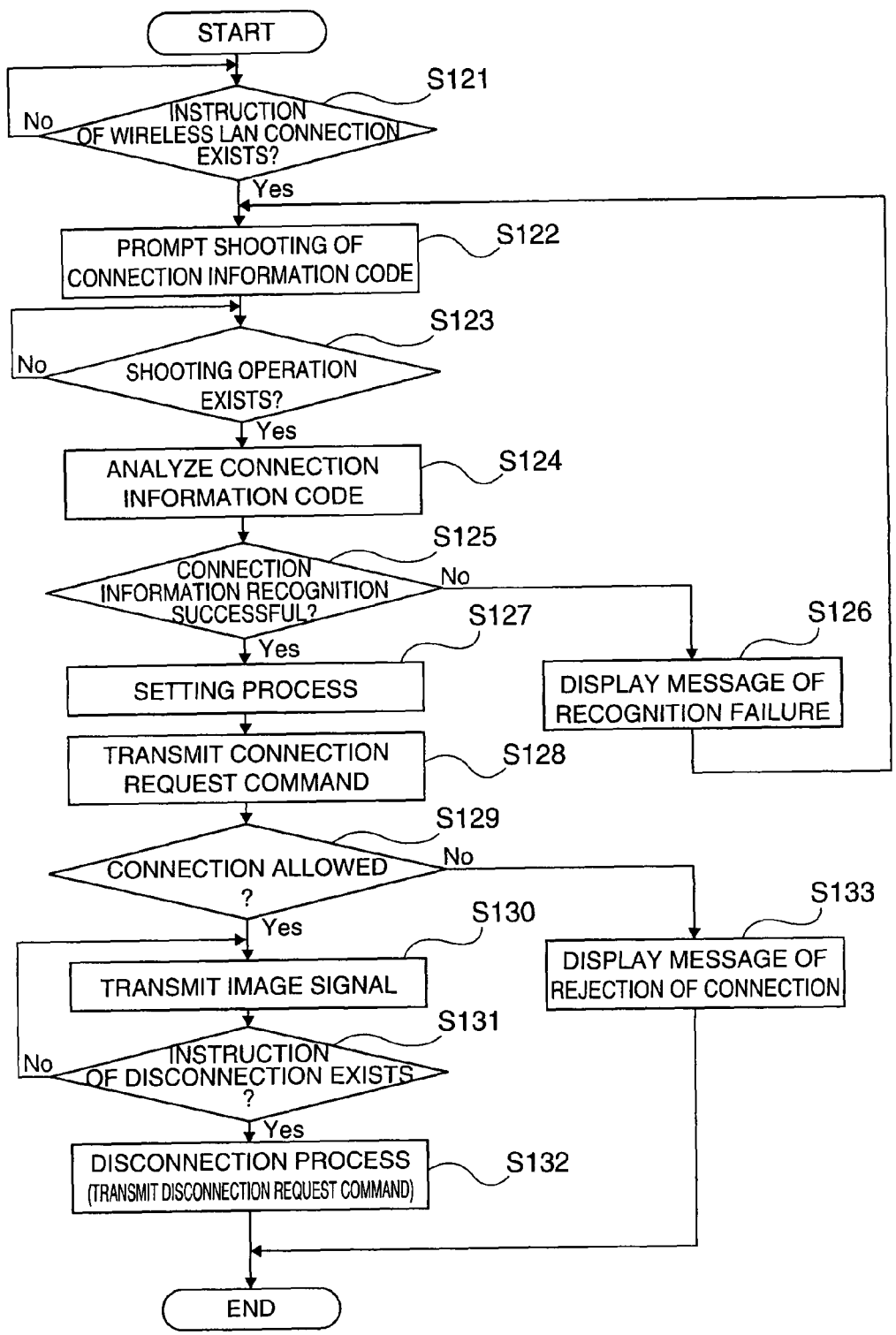
FIG. 7 is a flowchart for explaining the operation of an information terminal according to the first embodiment.
Figure 8:
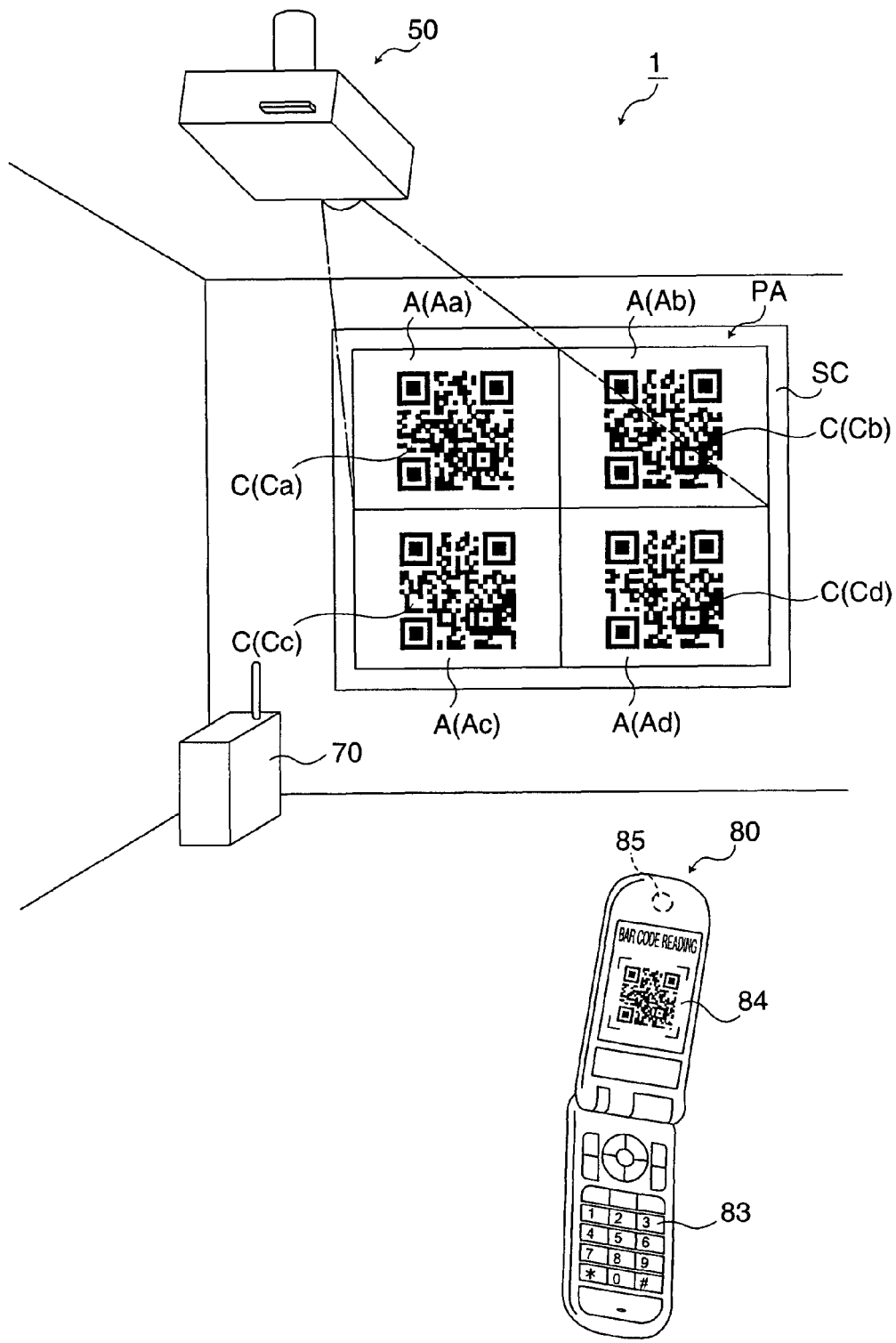
FIG. 8 is an explanatory diagram for explaining the operation of the information terminal according to the first embodiment.

FIG. 7 is a flowchart for explaining the operation of the information terminal 80, and FIG. 8 is an explanatory diagram for explaining the operation of the information terminal 80.

As shown in FIG. 7, in the step S121, the control section 81 judges whether or not the instruction (operation of the connection button) for starting the wireless LAN connection has been made in accordance with the operation signal input from the operation section 83. If the instruction has been made, the process proceeds to the step S122, and if not, the step S121 is repeated.

If the process proceeds to the step S122 in response to the instruction for starting the wireless LAN connection, the control section 81 starts the operation following the connection establishing program PM stored in the storage section 82. Firstly, the control section 81 switches the information terminal 80 to the camera mode, and at the same time, makes the display section 84 display a connection information code shooting screen to prompt shooting the connection information code C. The connection information code shooting screen is, for example, a screen provided with a monitor area for displaying the image shot by the imaging section 85 in real time below the title ("bar code reading"), and on the four corners of the monitor area there are displayed guide marks each having an angle bracket shape as shown in FIG. 8. The guide marks can be used as a target of the size of the connection information code C to be shot (recorded) when shooting (recording) the connection information code C, and by shooting (recording) the connection information code C with the size indicated by the guide marks, the recognition accuracy in recognizing the connection information can be improved.

Therefore, in the condition in which the connection information code C is displayed on the screen SC, the user trains the imaging section 85 of the information terminal 80 on the screen SC to make the connection information code C displayed in the sub-area A, in which the user wants an image to be displayed, be displayed in the monitor area of the display section 84 out of the connection information codes C displayed on the screen SC. After then, when the user performs an operation (shooting operation) of the shutter button of the operation section 83, the connection information code C is shot (recorded).

In the step S123, the control section 81 judges whether or not the shooting operation has been performed. If the shooting operation has been performed, the process proceeds to the step S124, and if not, the step S123 is repeated.

If the process proceeds to the step S124 after the shooting operation has been performed, the control section 81 stores the shot image (image data) in the storage section 82, and at the same time, operates with the code analysis program, a subroutine of the connection establishing program PM to analyze the connection information code C included in the shot image, and tries to recognize the connection information and the area information included therein.

In the step S125, the control section 81 judges whether or not the connection information and the area information have been recognized as a result of the analysis of the connection information code C. If the recognition has been successful, the process proceeds to the step S127, and if not, a message (e.g., "recognition failure," or "please shoot the connection information code once again") is displayed (step S126) on the display section 84, and then the process returns to the step S122.

If the recognition of the connection information and the area information has been successful, and the process proceeds to the step S127, the control section 81 performs setting for establishing the wireless LAN connection on the information terminal 80 based on the recognized connection information.

Further, in the step S128, the control section 81 transmits the connection request command for requiring the wireless LAN connection with the projector 50 to the projector 50 based on the recognized connection information and the recognized area information.

In the step S129, the control section 81 judges whether or not the connection response command allowing the connection has been received from the projector 50. If it has been received, the wireless LAN connection with the projector 50 is established, and the process proceeds to the step S130. On the other hand, if the connection response command rejecting the connection has been received, a message representing that the connection is not allowed because the designated sub-area A is in use such as "the designated area is in use" is displayed (step S133), and the process is terminated. It should be noted that since the control section 81 performs the wireless LAN connection (network connection) based on the recognized connection information by executing the steps S127 through S129, the control section 81 when executing the steps S127 through S129 corresponds to a network connection section of the embodiment of the invention.

In the step S130, the control section 81 retrieves the image data to be projected by the projector 50 from the storage section 82, and transmits the image data from the communication section 86 to the projector 50 as the image signal.

In the step S131, the control section 81 judges whether or not the instruction (operation of the disconnection button) for disconnecting the wireless LAN connection has been made by the user based on the operation signal from the operation section 83. If the instruction has been made, a process (step S132) for disconnecting the wireless LAN connection such as transmission of the disconnection request command to the protector 50 is performed, and then, the control section 81 returns to the standby state. On the other hand, if there is no instruction, the process returns to the step S130, the transmission of the image signal is continued.

Now, switching of the display condition of the image in the image display system 1 will be explained.

Although omitted in the flowcharts shown in FIGS. 3 and 7, if the user operates the display switching button while transmitting the image signal, the control section 81 of the information terminal 80 transmits a display switching command to the protector 50. Further, if the control section 55 of the projector 50 receives the display switching command from the information terminal 80, which is transmitting the image signal, while projecting the received image, the control, section 55 specifies the information terminal 80 by the IP address of the source of the transmission added to the command, and at the same time, instructs the image signal processing section 60 to generate the image data with which the received data from the information terminal 80 is displayed in the whole area of the projection area PA, and to output the image data to the light valve drive section 64.

Figure 9:
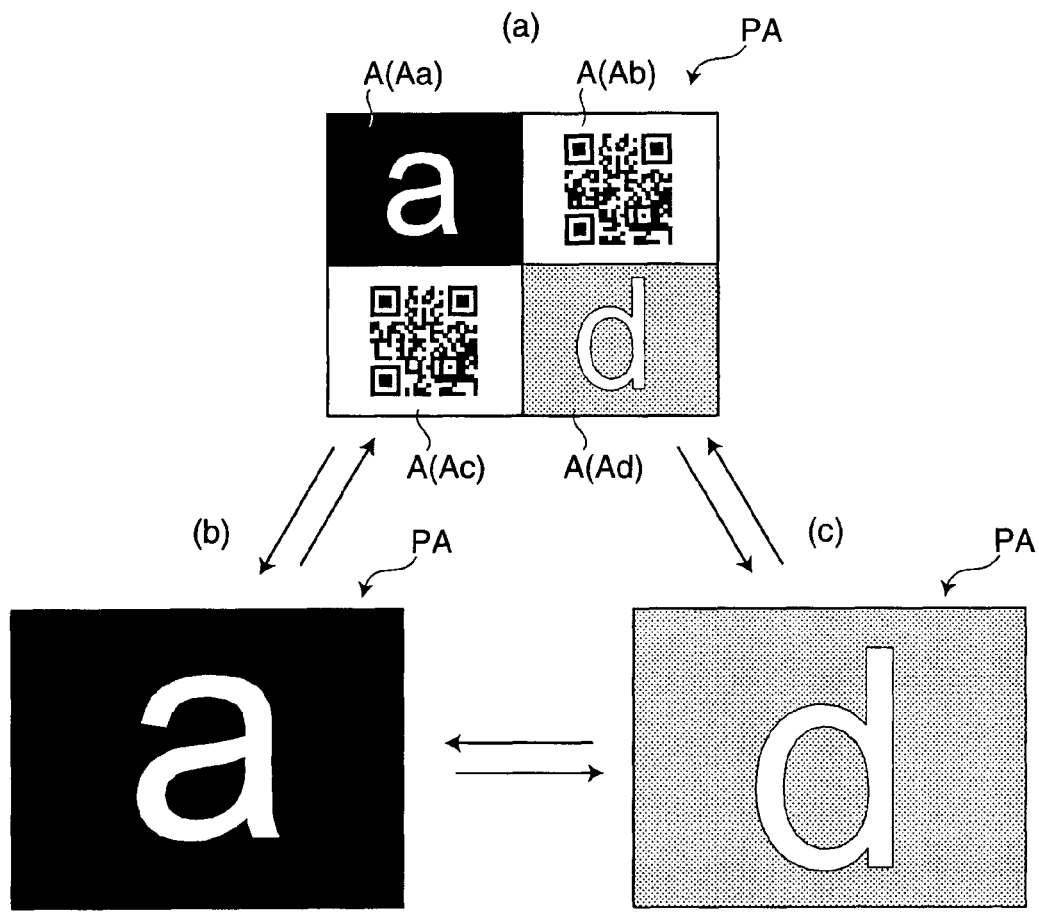
FIG. 9 is an explanatory diagram for explaining the operations of the projector when switching the state of the display wherein (a) through (c) respectively show the states of the display.

FIG. 9 is an explanatory diagram for explaining the operations of the projector 50 when switching the state of the display wherein (a) through (c) respectively show the states of the display.

As shown in (a) and (b) of FIG. 9, when the user operates the display switching button of the information terminal 80a in the condition in which the received image from the information terminal 80a is displayed in the sub-area Aa and the received image from the information terminal 80d is displayed in the sub-area Ad, the control section 81 of the information terminal 80a transmits the display switching command to the projector 50. When the control section 55 of the projector 50 receives the display switching command, the control section 55 of the projector 50 instructs the image signal processing section 60 to set the state (a whole screen display state) in which the received image from the information terminal 80a is displayed in the whole area of the projection area PA. Further, in this state, when the user operates the display switching button of the information terminal 80a again, the control section 81 of the information terminal 80a transmits the display switching command to the projector 50 again. When the control section 55 of the projector 50 receives the display switching command, the control section 55 of the projector 50 restores the display state (a split screen display state), which is the original display state divided into four sub-areas Aa through Ad.

Similarly, as shown in (a) and (c) of FIG. 9, if the display switching button of the information terminal 80d is operated in the split screen display state, the received image from the information terminal 80d becomes the whole screen display state, and when the display switching button of the information terminal 80d is operated again in this state, the split screen display state is restored. It should be noted that the control section 55 when instructing the image signal processing section 60 to switch the display state in response to the display switching command from the information terminal 80 corresponds to a switching section of the embodiment of the invention.

Further, for example, if the display switching button of the information terminal 80d is operated when the received image from the information terminal 80a is in the whole screen display state (see (b) of FIG. 9), the control section 55 sets the received image from the information terminal 80d to the whole screen display state (see (c) of FIG. 9), and if the display switching button of the information terminal 80a is operated when the received image from the information terminal 80d is in the whole screen display state (see (c) of FIG. 9), the control section 55 sets the received image from the information terminal 80a to the whole screen display state (see (b) of FIG. 9). In other words, if the received image from the information terminal 80, which has transmitted the display switching command, is not in the whole screen display state, the control section 55 sets the received image from that information terminal 80 to the whole screen display state, and if the received image from the information terminal 80, which has transmitted the display switching command, is in the whole screen display state, the control section 55 changes the whole screen display state into the split screen display state.

As explained above, according to the image display system 1 of the present embodiment, the following advantages can be obtained.

1. According to the image display system 1 of the present embodiment, since the projector 50 encodes the connection information for establishing the wireless LAN connection to itself to generate the connection information code C, and projects it as an image, the operation for attaching the contact-free tag or the printed material with the connection information described thereon to the projector 50 or the screen SC can be eliminated, and further a concern of attaching wrong connection information can also be eliminated.

Further, in the case in which a printed material provided with the connection information code described thereon is attached to the projector 50 and so on, it is desired that the material with the print small enough not to be obtrusive is attached thereto at an unnoticeable position. In the present embodiment, since the connection information code C is displayed be a projected image, it is possible to display only when the connection operation is performed, and in a large size. As a result, it becomes possible for the user to perform the connection operation (the operation of making the information terminal 80 recognize the connection information) in a wide area, and the necessity of moving to the position where the connection information can be recognized bringing the information terminal 80 therewith can be reduced.

As a result, the procedure for establishing the wireless LAN connection with the projector 50 can easily be performed.

2. According to the image display system 1 of the present embodiment, since the image signal processing section 60 of the projector 50 divides the projection area PA into a plurality of sub-areas A, and further, displays the received images from information terminals 80 different from each other in the respective sub-areas obtained by dividing the projection area PA, it becomes possible to easily recognize the connection state (e.g., the number of the information terminals 80 connected thereto, and what information terminal 80) of the network. As a result, for example, in a conference or the like in which people make presentations in sequence using one projector, it becomes possible to easily recognize whether or not the information terminal 80 of the next presenter has already been connected, thus the proceedings of the conference can efficiently be performed.

3. According to the image display system 1 of the present embodiment, the control section 55 of the projector 50 encodes the connection information for establishing the wireless LAN connection to itself added with the area information capable of specifying each of the sub-areas A, and thus, after generating a plurality of connection information code C respectively corresponding to the sub-areas A, the control section 55 displays the corresponding connection information code C in the respective sub-areas A. When the information terminal 80 shoots (records) either one of the displayed connection information codes C to recognize the connection information and the area information, and performs the wireless LAN connection based thereon, the control section 55 of the projector 50 displays the received image from the information terminal 80 in the sub-area A represented by the area information recognized by the information terminal 80. In other words, since it becomes possible for the user to make the image be displayed in a desired sub-area A by making the information terminal 80 recognize the connection information code C displayed in the sub-area A, the user can easily designate the sub-area A where the image is displayed.

Second Embodiment

An image display system according to a second embodiment of the invention will be explained with reference to the accompanying drawings.

Similarly to the case with the first embodiment, the image display system 1 of the present embodiment Is arranged to be able to display the received images from four information terminals 80 in the four sub-areas. However, in the present embodiment, it is arranged that the sub-areas A in which the received images from tile respective information terminals 80 are displayed are assigned by the projector 50 in accordance with the order in which the information terminals 80 are connected.

Figure 10:
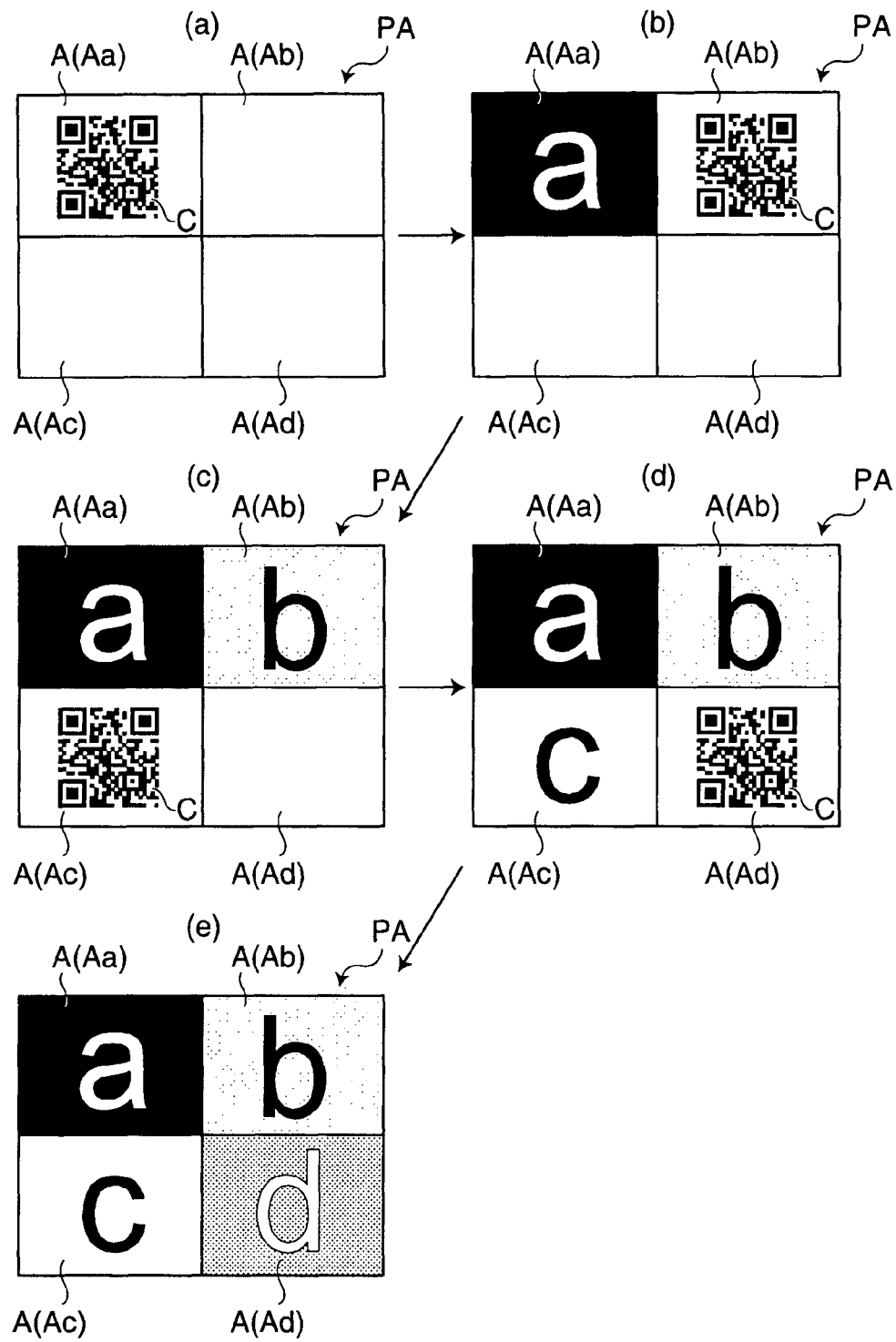
FIG. 10 is an explanatory diagram for explaining the operations of a projector according to a second embodiment when assigning sub-areas, wherein (a) through (e) show the projection area.

FIG. 10 is an explanatory diagram for explaining the operations of the projector 50 when the assigning sub-areas A, wherein (a) through (e) show the projection area PA of the projector 50.

As shown in (a) through (e) of FIG. 10, the connection establishing program PP defines that the received images from the information terminals 80 are displayed in the order of Aa, Ab, Ac, and Ad in accordance with the order in which the wireless LAN connections are established. In the step S103 in the flowchart shown in FIG. 3, the control section 55 generates a unique connection information code C not including the area information and common to all of the sub-areas A, and projects the connection information code C thus generated in the step S104. In this case, the control section 55 displays the connection information code C in the sub-area Aa in which the received image is displayed first (see (a) of FIG. 10).

In this state, if the wireless LAN connection with one information terminal 80 (referred to as an information terminal 80a) is established based on the displayed connection information code C, the control section 55 coordinates the IP address of the information terminal 80a with the sub-area Aa, and displays the received image from the information terminal 80a in the sub-area Aa, and at the same time displays the connection information code C in the sub-area Ab in which the received image is displayed next (see (b) of FIG. 10) After then, if the wireless LAN connection with the second information terminal 80 (referred to as an information terminal 80b) is established, the control section 55 coordinates the IP address of the information terminal 80b with the sub-area Ab in which the connection information code C has been displayed, and displays the received image from the information terminal 80b in the sub-area Ab, and at the same time, displays the connection information code C in the sub-area Ac in which the received image is to be displayed next (see (c) of FIG. 10). Further, if the wireless LAN connection with the third information terminal 80 (referred to as an information terminal 80c) is established, the control section 55 coordinates the IP address of the information terminal 80c with the sub-area Ac in which the connection information code C has been displayed, and displays the received image from the information terminal 80c in the sub-area Ac, and at the same time, displays the connection information code C in the sub-area Ad in which the received image is to be displayed next (see (d) of FIG. 10). In other words, every time the wireless LAN connection with a new information terminal 80 is established, the control section 55 displays the received image from this information terminal 80 in the sub-area A where the connection information code C has been displayed, and displays the connection information code C in the sub-area A in which the received image is to be displayed next. After then, if the wireless LAN connection with the fourth information terminal 80 (referred to as an information terminal 80d) is established, the control section 55 displays the received images from the four information terminals 80a through 80d in the respective sub-areas Aa through Ad, but does not display the connection information code C (see (e) of FIG. 10).

It should be noted that if the connection with one information terminal (e.g., assuming the information terminal 80b) is disconnected while displaying the received images from a plurality of information terminals 80a through 80d, the control section 55 displays the connection information code C in the sub-area Ab where the received image from the information terminal 80b has been displayed, and the received image from the information terminal 80 to be connected next via the wireless LAN connection will be displayed in the sub-area Ab. Alternatively, it is possible that in the case in which the connection with the information terminal 80b is disconnected, the received image from the information terminal 80c is displayed in the sub-area Ab, the received image from the information terminal 80d is displayed in the sub-area Ac, and at the same time, the connection information code C is displayed in the sub-area Ad, and then the received image from the information terminal to be connected next via the wireless LAN connection will be displayed in the sub-area Ad.

As explained above, according to the image display system 1 of the present embodiment, the following advantages can be obtained in addition to the advantages 1 and 2 in the first embodiment.

1. According to the image display system 1 of the present embodiment, since the assignment of the sub-areas A to the information terminals 80 connected via the wireless LAN connection is performed by the control section 55 of the projector 50, the connection information can be common to all of the sub-areas A. As a result, it is sufficient to display only one connection information code C, and the case in which a plurality of information terminals 80 try to display the image in the same sub-area A can be prevented.

2. According to the image display system 1 of the present embodiment, since the control section 55 of the projector 50 displays the connection information code C in the sub-area A in which the image will be displayed next, it becomes possible for the user who is going to establish the wireless LAN connection between the information terminal 80 and the projector 50 to know previously which sub-area A an image is going to be displayed in.

Third Embodiment

An image display system according to a third embodiment of the invention will be explained with reference to the accompanying drawings.

Figure 11:
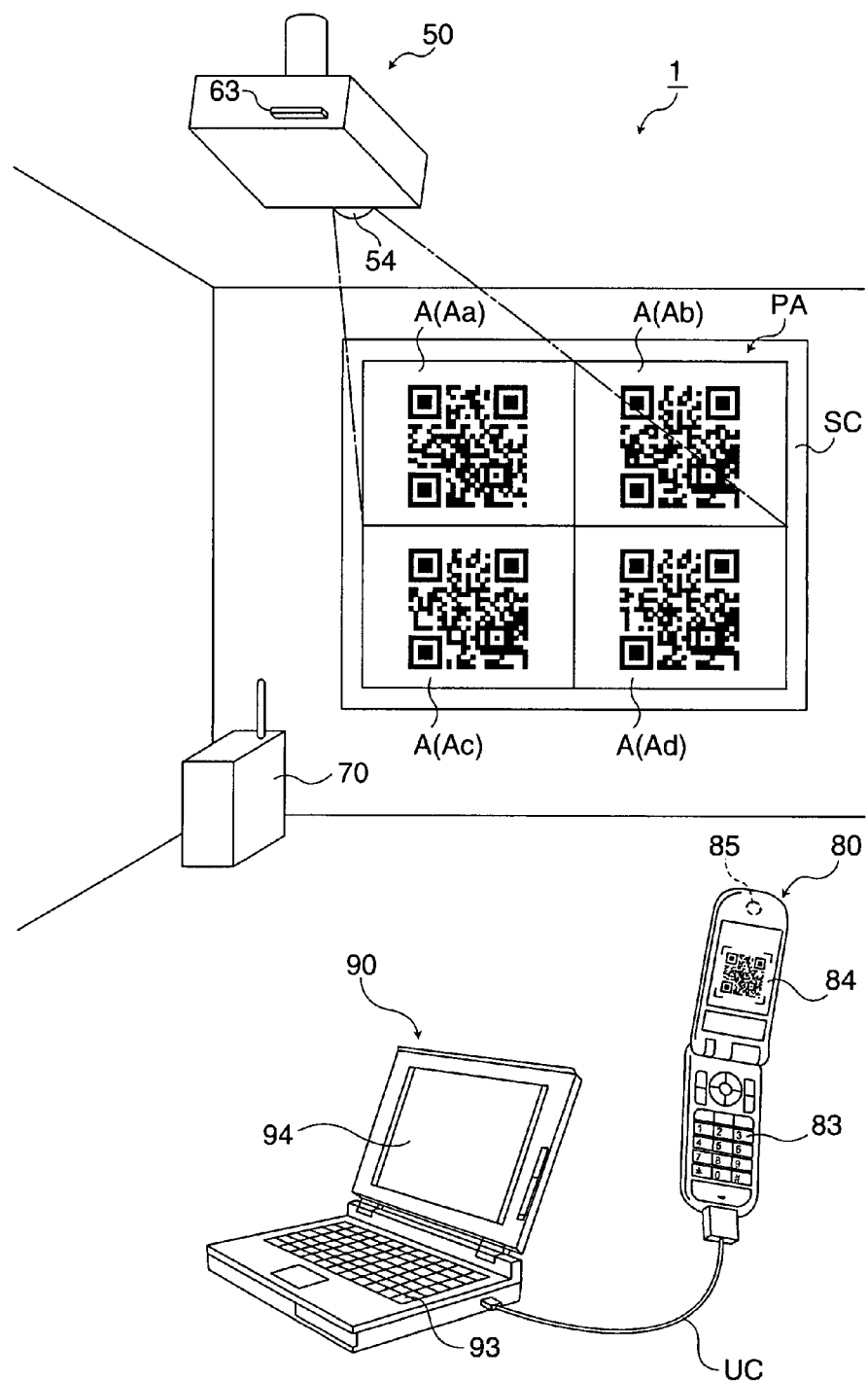
FIG. 11 is an explanatory diagram showing a schematic configuration of an image display system according to a third embodiment.

FIG. 11 is an explanatory diagram showing a schematic configuration of an image display system 1 according to the third embodiment.

As shown in FIG. 11, the image display system 1 of the present embodiment provided with a projector 50 having the same configuration as in the first embodiment as the image display device, and a laptop type of personal computer 90 (hereinafter referred to as a laptop PC) provided with an information terminal 80 connected thereto as an image supply device.

Figure 12:
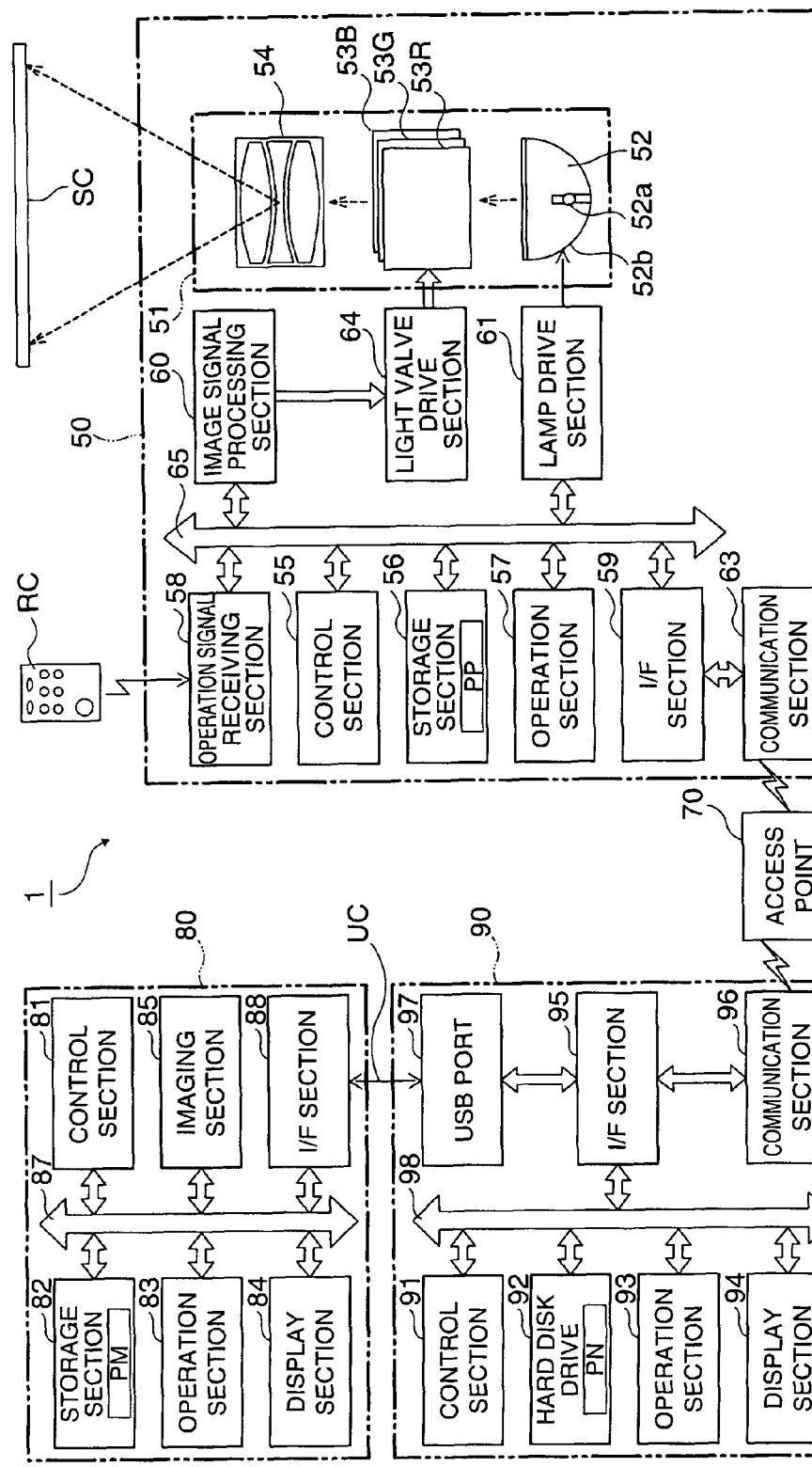
FIG. 12 is a block diagram showing the schematic configuration of the image display system according to the third embodiment.

FIG. 12 is a block diagram showing the schematic configuration of the image display system 1 according to the present embodiment.

As shown in FIG. 12, the projector 50 has the same configuration as in the first embodiment described above, the information terminal 80 has the same configuration as in the first embodiment except that the information terminal 80 has an interface (I/F) section 88 capable of wired data communication with an external device instead of the communication section 86.

The laptop PC 90 is provided with a control section 91, a hard disk drive 92, an operation section 93, a display section 94, and the interface (I/F) section 95, and the interface section 95 is provided with a communication section 96 and a USB port 97.

The control section 91 is composed of a CPU, a ROM, a RAM, and so on, and performs overall control of the various sections 92 through 95 described above connected to each other via the bus 98. The hard disk drive 92 is a storage device for storing an operating system (OS), an application program installed therein, or image data to be projected by the projector 50, and so on. The operation section 93 is a keyboard or a pointing device, and outputs an operation signal corresponding to the content of the operation by the user to the control section 91. The display section 94 is composed of a liquid crystal device or the like, and displays the image corresponding to the control of the control section 91.

When the power is applied to the laptop PC 90, the CPU in the control section 91 performs a boot process with the boot program stored in the ROM, loads the OS stored in the hard disk drive 92 in the RAM, and displays the operation screen (the desktop screen) on the display section 94. In this state, if start of an application program is instructed by the user operating the operation section 93, the control section 91 loads the application program stored in the hard disk drive 92 in the RAM, and performs an operational process with the program.

The hard disk drive 92 of the present embodiment includes a connection establishing program PN defining the content and the order of the process for establishing the wireless LAN connection with an external image display device as an application program. The connection establishing program PN includes a code analysis program for analyzing the connection information code C included in the image shot by the imaging section 85 of the information terminal 80 to recognize the connection information included in the connection information code C as a subroutine. It should be noted that since the control section 91 becomes to be able to analyze the connection information code C to recognize the connection information included therein when the control section 91 operates with the code analysis program, in the present embodiment, the control section 91 when operating in accordance with the code analysis program corresponds to a connection information recognition section of the embodiment of the invention.

The communication section 96 is a wireless LAN module compliant to the wireless LAN standard such as IEEE 802.11b, IEEE 802.11g, or IEEE 802.11a, and is capable of performing transmission and reception of command relating to the wireless LAN connection, transmission of the image signal, and so on in response to the instructions of the control section 91. It should be noted that as the communication section 96, a wireless LAN card or a wireless LAN adaptor connectable to the card slot or the USB port can also be used.

The USB port 97 is arranged to be able to perform data communication compliant to the USB standard with an external device, and is connected to the interface section 88 of the information terminal 80 via a cable UC in the present embodiment.

The operation of the laptop PC 90 will now be explained.

In the condition in which the power is applied to the laptop PC, when the user operates the operation section 93 to instruct the start of the connection establishing program PN, the control section 91 starts the operation with the connection establishing program PN stored in the hard disk drive 92, and displays an image for prompting various kinds of operations to the user on the display section 94, and also waits for signal input from the operation section 93. In this state, the user is allowed to make an instruction for starting the wireless LAN connection with the projector 50 by performing a predetermined operation using the operation section 93.

Figure 13:
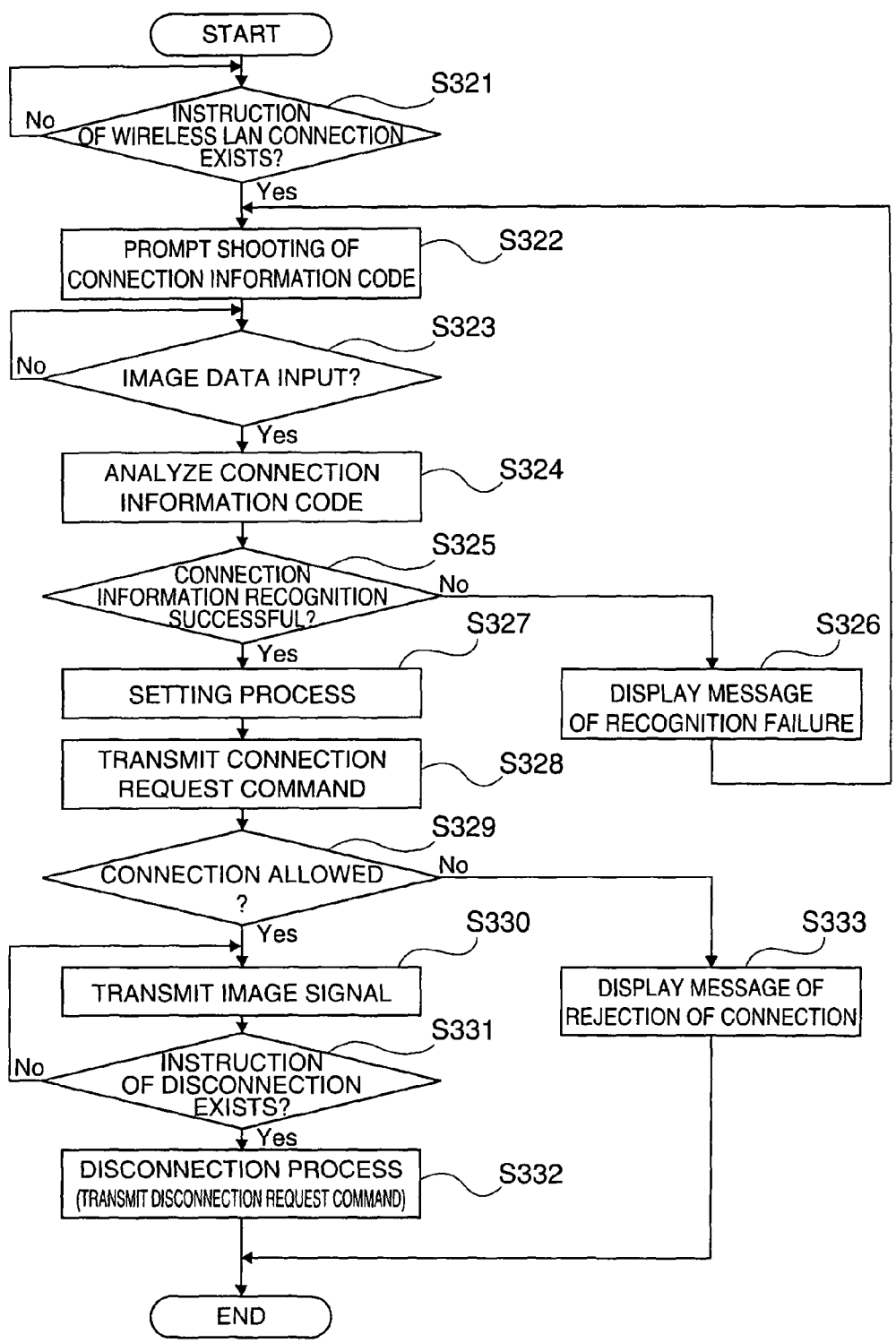
FIG. 13 is a flowchart for explaining the operation of a laptop PC according to the third embodiment.

FIG. 13 is a flowchart for explaining the operation of the laptop PC.

As shown in FIG. 13, in the step S321, the control section 91 judges whether or not the instruction for starting the wireless LAN connection has been made in accordance with the operation signal input from the operation section 93. If the instruction has been made, the process proceeds to the step S322, and if not, the step S321 is repeated.

If the instruction for starting the wireless LAN communication has been made and the process proceeds to the step S322, the control section 91 displays a message on the display section 94 to prompt shooting of the connection information code C using the information terminal 80 and transmission of the shooting result, and waits for the shooting result input from the information terminal 80 via the USB port 97.

When the message described above is displayed, in the condition in which the connection information code C is protected from the projector 50 to the screen SC (step S104), the user is requested to set the information terminal 80 to the camera mode and shoot (record) one of the projected connection information codes C. Further, if the user performs an operation for transmitting the shot image to the laptop PC 90, the image data representing the shot image is output to the laptop PC 90 via the interface section 88.

In the step S323, the control section 91 judges whether or not the image data has been input from the information terminal 80. If the image data has been input via the USB port 97, the process proceeds to the step S324, and if not, the step S323 is repeated.

If the process proceeds to the step S324 after the image data has been input, the control section 91 stores the image data in the hard disk drive 92, and at the same time, performs the code analysis program, a subroutine of the connection establishing program PN to analyze the connection information code C included in the image data (the shot image), and tries to recognize the connection information and the area information included therein.

In the step S325, the control section 91 judges whether or not the connection information and the area information have been recognized as a result of the analysis of the connection information code C. If the recognition has been successful, the process proceeds to the step S327, and if not, a message representing that the recognition has failed is displayed (step S326) on the display section 94, and then the process returns to the step S322.

If the recognition of the connection information and the area information has been successful, and the process proceeds to the step S327, the control section 91 performs setting for establishing the wireless LAN connection on the laptop PC 90 based on the recognized connection information.

Further, in the step S328, the control section 91 transmits the connection request command for requiring the wireless LAN connection with the projector 50 to the projector 50 based on the recognized connection information and the recognized area information.

In the step S329, the control section 91 judges whether or not the connection response command allowing the connection has been received from the projector 50. If it has been received, the wireless LAN connection with the projector 50 is established, and the process proceeds to the step S330. On the other hand, if the connection response command rejecting the connection has been received, a message representing that the connection is not successful is displayed (step S333) and the process is terminated. It should be noted that since the control section 91 performs the wireless LAN connection (network connection) based on the recognized connection information by executing the steps S327 through S329, the control section 91 when executing the steps S327 through S329 corresponds to a network connection section of the embodiment of the invention.

In the step S330, the control section 91 retrieves the image data to be projected by the projector 50 from the hard disk drive 92, and transmits the image data from the communication section 96 to the projector 50 as the image signal.

In the step S331 the control section 91 judges whether or not the instruction for disconnecting the wireless LAN connection has been made by the user based on the operation signal from the operation section 93. If the instruction has been made, a process (step S332) for disconnecting the wireless LAN connection such as transmission of the disconnection request command to the projector 50 is performed, and then, the control section 91 returns to the standby state. On the other hand, if there is no instruction, the process returns to the step S330, the transmission of the image signal is continued.

As explained above, according to the image display system 1 of the present embodiment, similar advantages to those in the first embodiment can be obtained.

MODIFIED EXAMPLE

It should be noted that the embodiments of the invention can be modified as follows.

Although in the first and the third embodiments, in order for making it possible to specify one of the sub-areas Aa through Ad desired by the user, the connection information common to the four sub-areas Aa through Ad is encoded together with the area information different among the four sub-areas Aa through Ad to generate four different connection information codes Ca through Cd, it is also possible to previously assign connection information different from each other to the respective sub-areas Aa through Ad and then to encode them. For example, if it is arranged that the projector 50 can designate the IP address of the information terminal 80 by including the IP address of the information terminal 80 in the connection information, and the IP addresses are set differently in accordance with the sub-areas Aa through Ad, desired one of the sub-areas Aa through Ad can be specified by the IP address of the source of transmission of the image signal.

In the first and the third embodiments, the control section 55 of the projector 50 stores the IP address and the area information in the RAM while coordinating with each other immediately after the wireless LAN connection has been established (step S107), and when the image signal is input in the step S108, the information terminal 80, the source of the transmission, is identified by the IP address included in the received signal, and the area information corresponding to the IP address is retrieved from the RAM. Although the control section 55 designates the sub-area A in which the received image is displayed by outputting the area information to the image signal processing section 60, it is also possible that the information terminal 80 transmits the image signal added with the area information, and the control section 55 of the projector 50 obtains the area information every time the image signal is input, and outputs the area information to the image signal processing section 60.

Although in the second embodiment, the connection information code C is displayed in the sub-area A in which image will be displayed next, it is also possible that the connection information code C continues to be displayed always in a specific area, for example, the area (sub-area Ad)

in which the received image from the information terminal 80 to be connected lastly until the fourth information terminal 80 is connected.

Although in the third embodiment, the information terminal 80 and the laptop PC 90 are connected via the cable UC, and the wired data communication is performed, the connection type between the information terminal 80 and the laptop PC 90 is not so limited, but the wireless communication, for example, infrared communication or Bluetooth (registered trademark) can also be used. Further, an imaging device such as a digital camera can also be used instead of the information terminal 80.

Although in the third embodiment, the information terminal 80 transmits the shot image data of the connection information code C to the laptop PC 90, and the laptop PC 90 analyzes the connection information code C to perform recognition of the connection information and the area information, it is also possible that the information terminal 80 performs up to the recognition of the connection information, and transmits the recognized connection information and so on to the laptop PC.

Although in the first through the third embodiments, in the split screen display state, the projection area PA is divided into four, the number of division is not limited to four, but can be five or more (e.g., 9-way split or 16-way split), or three or less.

Although in the first through the third embodiments, as the type of the network, the case with the wireless LAN is explained as an example, in the case with other wireless network such as the wireless USB, or in the case with the wired network such as the wired LAN, the embodiment of the invention can be applied.

Although in the first through third embodiments the image is formed using three liquid crystal light valves 53R, 53G, and 53B, it is possible to have a configuration of forming the color image with a single liquid crystal light valve. Here, the liquid crystal light valve can be either one of the transmissive type or the reflective type. Further, a micromirror array device for modulating the light emitted from the light source by controlling the emission direction of the incident light for every micromirror as a pixel can also be used instead of the liquid crystal light valve.

Although in the first through the third embodiments, the case of using the projector 50 as the image display device is exemplified, a rear projector integrally provided with a transmissive screen, a cathode ray tube (CRT) display, a liquid crystal display, a plasma display, a surface-conduction electron-emitter display (SED), an organic electroluminescence (EL) display and so on also be used.

Although in the first through the third embodiments, the case in which the information terminal 80 or the laptop PC 90 are used as the image supply device is exemplified, it is sufficient for the image supply device of the embodiment of the invention to have a configuration capable of establishing a network connection with the image display device and of transmitting the image signals, and other portable information equipment such as PDA or a digital camera compliant to the wireless LAN standard can also be used for the image supply device.

The disclosure of Japanese Patent Application No. 2006-255626, filed Sep. 21, 2006 is expressly incorporated by reference herein.

What is claimed is:

1. An image display device for displaying an image based on an image signal input from a plurality of image supply devices via a network, comprising:

a storage section storing connection information for the image supply device to connect to the image display device via the network;

an encoding section encoding the connection information to generate a connection information code which can be recognized by the image supply device;

a display section displaying the connection information code and the image based on the image signal input from the image supply device; and an image control section dividing an image display area of the display section into a plurality of divisional areas, and displaying the image based on the image signal input from respective one of the image supply devices in each of the divisional areas, the display section displaying the connection information code in each of the divisional areas.

2. The image display device according to claim 1, wherein the encoding section adds area information used for specifying each of the divisional areas to the connection information, and encodes the connection information added with the area information to generate a plurality of connection information codes respectively corresponding to the divisional areas, and the image control section displays the connection information codes in the respective divisional areas to allow the image supply devices to recognize the connection information and the area information, and then obtains the area information recognized by the image supply device, and further displays the image based on the image signal input from the image supply device in the divisional area indicated by the area information.

3. The image display device according to claim 1, wherein the different connection information is assigned to each of the divisional areas, the encoding section encodes the connection information assigned to each of the divisional areas to generate a plurality of connection information codes, and the image control section displays the connection information codes in the respective divisional areas to allow the image supply devices to recognize the connection information, and then obtains the connection information recognized by the image supply device, and further displays the image based on the image signal input from the image supply device in the divisional area corresponding to the connection information.

4. The image display device according to claim 1, wherein the encoding section generates the connection information code common to the divisional areas, and the image control section displays the connection information code in the display section to allow the image supply devices to recognize the connection information, and then assigns either one of the plurality of divisional areas to the image supply device connected via the network, and displays the image based on the image signal input from the image supply device in the divisional area assigned to the image supply device.

5. The image display device according to claim 1, further comprising:

a switching section switching between a state in which a plurality of images based on the image signals input from the plurality of image supply devices are displayed in the image display area of the display section and a state in which the image based on the image signal input from either one of the plurality of image supply devices is displayed in substantially the whole area of the image display area.

6. An image display system comprising a plurality of image supply devices each outputting an image signal, and an image display device displaying an image based on the image signal input from each of the plurality of image supply devices via a network, wherein
 the image display device includes
  a storage section storing connection information for the image supply device to connect to the image display device via the network,
  an encoding section encoding the connection information to generate a connection information code which can be recognized by the image supply device,
  a display section displaying the connection information code and the image based on the image signal input from the image supply device, and
  an image control section dividing an image display area of the display section into a plurality of divisional areas, and displaying the image based on the image signal input from respective one of the image supply devices in each of the divisional areas,
  the display section displaying the connection information code in each of the divisional areas,
 the image supply device includes,
  a connection information recognition section analyzing the connection information code displayed by the display section to recognize the connection information, and
  a network connection section, based on the connection information recognized by the connection information recognition section, establishing a network connection with the image display device.

7. A network connecting method of an image display system including an image supply device outputting an image signal, and an image display device having a display section, and displaying an image based on the image signal input from the image supply device via a network in an image display area of the display section, comprising:
 a first step in which the image display device encodes connection information for connecting the image display device itself via the network to generate a connection information code which can be recognized by the image supply device;
 a second step in which the image display device displays the connection information code in the image display area;
 a third step in which the image supply device analyzes the connection information code displayed in the image display area to recognize the connection information;
 a fourth step in which the image supply device performs the network connection with the image display device based on the recognized connection information;
 a fifth step in which the image display device coordinates one of divisional areas obtained by dividing the image display area with the image supply device connected via the network; and
 a sixth step in which the image display device displays the image based on the image signal input from the image supply device in the area coordinated with the image supply device,
 the display device displaying the connection information code in each of the divisional areas.

* * * * *